US010252919B2

(12) United States Patent
Billieres et al.

(10) Patent No.: US 10,252,919 B2
(45) Date of Patent: Apr. 9, 2019

(54) HIGHLY PURE POWDER INTENDED FOR THERMAL SPRAYING

(71) Applicant: SAINT-GOBAIN CENTRE DE RECHERCHES ET D'ETUDES EUROPEEN, Courbevoie (FR)

(72) Inventors: Dominique Billieres, Saint Saturnin les Avignon (FR); Alain Alimant, Montfavet (FR); Howard Wallar, Rutland, MA (US)

(73) Assignee: SAINT-GOBAIN CENTRE DE RECHERCHES ET D'ETUDES EUROPEEN, Courbevoie (FR)

( * ) Notice: Subject to any disclaimer, the term of this patent is extended or adjusted under 35 U.S.C. 154(b) by 89 days.

(21) Appl. No.: 14/648,539

(22) PCT Filed: Nov. 29, 2013

(86) PCT No.: PCT/IB2013/060514
§ 371 (c)(1),
(2) Date: May 29, 2015

(87) PCT Pub. No.: WO2014/083544
PCT Pub. Date: Jun. 5, 2014

(65) Prior Publication Data
US 2015/0298986 A1   Oct. 22, 2015

Related U.S. Application Data

(60) Provisional application No. 61/734,744, filed on Dec. 7, 2012.

(30) Foreign Application Priority Data

Nov. 29, 2012 (FR) ..................... 12 61421

(51) Int. Cl.
| | | |
|---|---|---|
| C01F 17/00 | (2006.01) | |
| C01G 27/02 | (2006.01) | |
| B05B 7/22 | (2006.01) | |
| B65D 25/14 | (2006.01) | |
| C23C 4/11 | (2016.01) | |
| C23C 4/134 | (2016.01) | |

(52) U.S. Cl.
CPC ............ C01F 17/0043 (2013.01); B05B 7/22 (2013.01); B65D 25/14 (2013.01); C01F 17/0018 (2013.01); C01G 27/02 (2013.01); C23C 4/11 (2016.01); C23C 4/134 (2016.01); *C01P 2004/54* (2013.01); *C01P 2004/60* (2013.01); *C01P 2004/61* (2013.01); *C01P 2006/10* (2013.01); *C01P 2006/12* (2013.01); *C01P 2006/14* (2013.01); *C01P 2006/80* (2013.01)

(58) Field of Classification Search
CPC .............. C01F 17/0012; C01F 17/0043; C01F 17/0018; C23C 4/11; C23C 4/134; C01G 27/02

USPC ......... 423/263, 608, DIG. 12; 501/126, 127, 501/152; 264/10; 427/453, 454; 428/402
See application file for complete search history.

(56) References Cited

U.S. PATENT DOCUMENTS

| | | | | |
|---|---|---|---|---|
| 4,450,184 A | * | 5/1984 | Longo ..................... | C23C 4/10 427/453 |
| 6,916,534 B2 | | 7/2005 | Wataya et al. | |
| 7,329,467 B2 | | 2/2008 | Billieres et al. | |
| 7,934,836 B2 | | 5/2011 | Ito | |
| 2002/0018902 A1 | * | 2/2002 | Tsukatani ................. | C23C 4/11 428/469 |
| 2002/0160189 A1 | * | 10/2002 | Wataya ............... | C01F 17/0043 428/402 |
| 2002/0192429 A1 | * | 12/2002 | Takai ....................... | C23C 4/11 428/143 |

(Continued)

FOREIGN PATENT DOCUMENTS

| | | | |
|---|---|---|---|
| EP | 1167565 | * | 1/2002 |
| WO | 2010103497 A2 | | 9/2010 |

OTHER PUBLICATIONS

Feb. 27, 2014 International Search Report in Patent Application PCT/IB2013/060514.

(Continued)

*Primary Examiner* — Steven J Bos
(74) *Attorney, Agent, or Firm* — Oliff PLC

(57) ABSTRACT

Powder of particles, more than 95% by number of said particles exhibiting a circularity greater than or equal to 0.85, wherein said powder contains more than 99.8% of a rare earth oxide and/or of hafnium oxide and/or of yttrium aluminum oxide, as percentage by weight relative to the oxides, and has: a median particle size D 50 of between 10 and 40 microns and a size dispersion index (D 90–D 10)/D 50 of less than 3; a percentage by number of particles having a size less than or equal to 5 μm which is less than 5%; an apparent-density dispersion index (P<50–P)/P of less than 0.2, the cumulative specific volume of the pores which have a radius of less than 1 μm being less than 10% of the apparent volume of the powder, in which the percentiles Dn of the powder are the particle sizes corresponding to the percentages, by number, of n %, on the curve of cumulative distribution of the particle size of the powder, the particle sizes being classified in increasing order, the density P<50 being the apparent density of the fraction of particles having a size less than or equal to D50, and the density P being the apparent density of the powder.

14 Claims, 3 Drawing Sheets

(56) References Cited

U.S. PATENT DOCUMENTS

Figure 1:
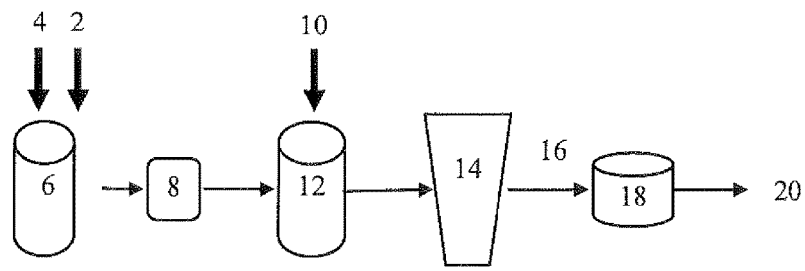

2006/0116274 A1* 6/2006 Kitamura ............ C01F 17/0043
501/152
2007/0077363 A1 4/2007 Kitamura et al.
2008/0112873 A1 5/2008 Aoki et al.
2011/0129399 A1* 6/2011 Xie ........................... B01J 2/04
423/263

OTHER PUBLICATIONS

Feb. 27, 2014 Written Opinion in Patent Application PCT/IB2013/060514.

* cited by examiner

HIGHLY PURE POWDER INTENDED FOR THERMAL SPRAYING

TECHNICAL FIELD

The invention relates to a powder capable of being deposited by plasma, to a process for manufacturing such powder and to a liner obtained by plasma spraying of said powder.

STATE OF THE ART

The internal surfaces of chambers used to treat (for example by plasma etch) semiconductors, for example silicon wafers, are conventionally protected with a ceramic liner applied by plasma spraying. This liner has to be highly resistant to halogen-comprising plasmas or to highly corrosive environments. Plasma spraying requires, as feed powder, a powder exhibiting a good fluidity and a particle morphology which makes possible appropriate heating during the spraying. In particular, the size of the particles has to be sufficient for the particles to penetrate the plasma and to limit the losses by vaporization.

For example, the very fine powders obtained directly by chemical or pyrolytic manufacturing processes are not suitable for plasma spraying without an additional stage of consolidation in order to form larger (and porous) agglomerates, in particular sintered agglomerates. Since plasma spraying does not result in the melting of all the agglomerates, the resulting liner exhibits a porosity. The total porosity of the liner obtained by spraying sintered agglomerates is typically 2-3%, which would not be appropriate to protect the internal surfaces of an etching chamber for semiconductors. In particular, the sintered powders described in U.S. Pat. No. 6,916,534, US2007/077363 or US2008/0112873 cannot result in a very dense liner by thermal spraying. Furthermore, the liners obtained from porous agglomerates result, over time, in the release of particles when they are exposed to corrosive environments.

U.S. Pat. No. 7,931,836 or US 2011/0129399 discloses a powder formed of particles resulting from plasma melting to form liquid droplets which solidify in free flow. In some embodiments, more than approximately 90% of the particles of starting material can be completely or partially converted into the liquid form. The bulk density of the resulting powder is between 1.2 and 2.2 $g/cm^3$.

In the abovementioned application, the powders obtained by grinding a molten mass are not appropriate either, because of the impurities which are added during the grinding stage.

Rare earth metal oxides and/or hafnium oxide and/or yttrium-aluminum oxides are known to exhibit a good intrinsic resistance to chemical attacks. However, they have a high melting temperature and a low thermal diffusion. It is thus difficult to obtain a very dense liner starting from these particles by plasma spraying.

It is an object of the invention to provide a powder which can be efficiently sprayed by plasma, with a good productivity, and which can result in a very pure and extremely dense liner.

SUMMARY OF THE INVENTION

With this aim, the invention provides a powder (hereinafter "feed powder") formed of particles (hereinafter "feed particles"), more than 95% by number of said particles exhibiting a circularity of greater than or equal to 0.85, said powder comprising more than 99.8% of a rare earth metal oxide and/or of hafnium oxide and/or of an yttrium-aluminum oxide, as percentage by weight on the basis of the oxides, and having:

a median particle size $D_{50}$ of between 10 and 40 microns and a size dispersion index $(D_{90}-D_{10})/D_{50}$ of less than 3;

a percentage by number of particles having a size of less than or equal to 5 μm which is less than 5%;

a bulk density dispersion index $(P_{<50}-P)/P$ of less than 0.2, the cumulative specific volume of the pores having a radius of less than 1 μm being less than 10% of the bulk volume of the powder, in which the $D_n$, percentiles of the powder are the particle sizes corresponding to the percentages, by number, of n %, on the cumulative distribution curve of the size of the particles of the powder, the particle sizes being classified by increasing order, the density $P_{<50}$ being the bulk density of the fraction of the particles having a size of less than or equal to $D_{50}$, and the density P being the bulk density of the powder.

A feed powder according to the invention is thus a very pure powder largely composed of spherical particles. This powder is noteworthy, in particular, by the low size dispersion of the particles, in that the bulk density of the particles having a size less than the median particle size $D_{50}$ is substantially the same as that of the particles having a size of greater than or equal to $D_{50}$ and in that it comprises few very fine particles having a size of less than or equal to 5 μm.

A feed powder according to the invention can also comprise one or more of the following optional characteristics:

More than 95%, preferably more than 99%, preferably more than 99.5%, by number of said particles have a circularity of greater than or equal to 0.87, preferably of greater than or equal to 0.90.

The powder comprises more than 99.9%, more than 99.950%, more than 99.990%, preferably more than 99.999%, of a rare earth metal oxide and/or of hafnium oxide and/or of an yttrium-aluminum oxide, in particular YAG. The amount of the other oxides is thus so low that it cannot have a significant effect on the results obtained with a feed powder according to the invention.

The oxides represent more than 98%, more than 99%, more than 99.5%, more than 99.9%, more than 99.95%, more than 99.985% or more than 99.99% of the weight of the powder.

Said rare earth metal is chosen from the group formed by yttrium (Y), gadolinium (Gd), scandium (Sc), dysprosium (Dy), neodymium (Nd) and ytterbium (Yb). Preferably, said rare earth metal is yttrium.

Said yttrium-aluminum oxide is an yttrium-aluminum oxide composite, preferably YAG (Yttrium-Aluminum Garnet $Y_3Al_5O_{12}$, comprising approximately 58% by weight of yttrium oxide) and/or YAP (Yttrium-Aluminum perovskite, comprising approximately 68.9% by weight of yttrium oxide).

The median size of the particles ($D_{50}$) of the powder is greater than 15 μm and/or less than 30 μm.

The 10 percentile ($D_{10}$) of the particle sizes is greater than 1 μm, preferably greater than 5 μm, preferably greater than 10 μm, or also greater than 13 μm.

The 90 percentile ($D_{90}$) of the particle sizes is less than 60 μm, preferably less than 50 μm, preferably less than 40 μm.

The 99.5 percentile ($D_{99.5}$) of the particle sizes is less than 80 μm, preferably less than 60 μm.

The size dispersion index $(D_{90}-D_{10})/D_{50}$ is preferably less than 2.2, preferably less than 2.0, preferably less than 1.8, preferably less than 1.5, preferably less than 1.3, preferably less than 1.1, preferably less than 1, or preferably again less than 0.9, and preferably greater than 0.4, preferably greater than 0.7, preferably greater than 0.8.

Preferably, the powder exhibits a monomodal dispersion type, that is to say just one main peak.

The percentage by number of the feed particles having a size of less than 10 μm is preferably less than 5%, preferably less than 4.5%, preferably less than 4%, preferably less than 3%, preferably less than 2.5%, preferably less than 2%.

The percentage by number of the feed particles having a size of less than 5 μm is preferably less than 4%, preferably less than 3%, preferably less than 2%, preferably less than 1.5%, preferably less than 1%.

The cumulative specific volume of the pores with a radius of less than 1 μm is less than 8%, preferably less than 6%, preferably less than 5%, preferably less than 4%, preferably less than 3.5%, of the bulk volume of the powder.

The specific surface is preferably less than 5 m²/g, preferably less than 3 m²/g, preferably less than 2 m²/g, preferably less than 1 m²/g, preferably less than 0.5 m²/g.

The bulk density dispersion index $(P_{<50}-P)/P$ is preferably less than 0.15, preferably less than 0.1.

The relative density of the feed powder is preferably greater than 0.4 and/or less than 0.8, preferably greater than 0.45 and/or less than 0.7.

The bulk density of the powder is greater than 2.25 g/cm³, preferably greater than 2.30 g/cm³, preferably greater than 2.35 g/cm³, preferably greater than 2.40 g/cm³, more preferably greater than 2.45 g/cm³.

The invention also relates to a process for the manufacture of a feed powder according to the invention comprising the following successive stages:

a) granulation of particles so as to obtain a powder formed of granules having a median size $D_{50}$ of between 20 and 60 microns and comprising more than 99.8% of a rare earth metal oxide and/or of hafnium oxide and/or of an yttrium-aluminum oxide, as percentage by weight on the basis of the oxides;

b) injection of said powder formed of granules, via a carrier gas, through an injector as far as a plasma jet generated by a plasma gun, so as to obtain molten droplets;

c) cooling said molten droplets, so as to obtain a feed powder according to the invention;

d) optionally, particle size selection, preferably by sieving or by air classification, of said feed powder.

Preferably, there is no intermediate consolidation stage and in particular no sintering stage between stages a) and b). This absence of intermediate consolidation stage advantageously improves the purity of the feed powder.

A process for the manufacture of a powder according to the invention may also comprise one or more of the following optional characteristics:

in stage a), the granulation is preferably an atomization or spray drying or pelletization (transformation into pellets) process.

In stage a), the mineral composition of the powder formed of granules comprises more than 99.9%, more than 99.95%, more than 99.99%, preferably more than 99.999%, of an oxide of a rare earth metal and/or of hafnium oxide and/or of an yttrium-aluminum oxide, as percentage by weight on the basis of the oxides.

The median circularity $C_{50}$ of the powder formed of granules is preferably greater than 0.85, preferably greater than 0.90, preferably greater than 0.95, and more preferably greater than 0.96.

The $C_5$ centile is preferably greater than or equal to 0.85, preferably greater than or equal to 0.90.

The median aspect ratio $A_{50}$ of the powder formed of granules is preferably greater than 0.75, preferably greater than 0.8.

The specific surface of the powder formed of granules is preferably less than 15 m²/g, preferably less than 10 m²/g, preferably less than 8 m²/g, preferably less than 7 m²/g.

The cumulative volume of the pores having a radius of less than 1 μm, measured by mercury porosimetry, of the powder formed of granules is preferably less than 0.5 cm³/g, preferably less than 0.4 cm³/g or also preferably less than 0.3 cm³/g.

The bulk density of the powder formed of granules is preferably greater than 0.5 g/cm³, preferably greater than 0.7 g/cm³, preferably greater than 0.90 g/cm³, preferably greater than 0.95 g/cm³, preferably less than 1.5 g/cm³, preferably less than 1.3 g/cm³, preferably less than 1.1 g/cm³.

The 10 percentile $(D_{10})$ of the particle sizes of said powder formed of granules is preferably greater than 10 μm, preferably greater than 15 μm, preferably greater than 20 μm.

The 90 percentile $(D_{90})$ of the particle sizes of said powder is preferably less than 90 μm, preferably less than 80 preferably less than 70 μm, preferably less than 65 μm.

The powder formed of granules preferably has a median size $D_{50}$ of between 20 and 60 microns.

The powder formed of granules preferably has a $D_{10}$ of between 20 and 25 μm and a $D_{90}$ of between 60 and 65 μm.

The 99.5 percentile $(D_{99.5})$ of the particle sizes of said powder formed of granules is preferably less than 100 μm, preferably less than 80 μm, preferably less than 75 μm.

The size dispersion index $(D_{90}-D_{10})/D_{50}$ of said powder formed of granules is preferably less than 2, preferably less than 1.5, preferably less than 1.2, or preferably less than 1.1.

In stage b), the diameter of the orifice(s) of the injector(s) is greater than 1.8 mm, preferably greater than 1.9 mm, preferably greater than or equal to 2.0 mm.

The flow rate of the carrier gas (per injector orifice (that is to say per "powder line")) is less than 5.5 l/min, preferably less than 5.0 l/min, preferably less than 4.5 l/min, preferably less than 4.0 l/min, preferably less than or equal to 3.5 l/min.

The powder formed of granules is injected into the plasma jet at a feed rate of 30 to 60 g/min per injector orifice.

The total feed rate for granules (for all the injector orifices) is greater than 90 g/min, and preferably less than 180 g/min, preferably less than 160 g/min, preferably less than 140 g/min, preferably less than or equal to 120 g/min.

Preferably, in stage c), the cooling of the molten droplets is such that, up to 500° C., the mean cooling rate is between 50 000 and 200 000° C./s, preferably between 80 000 and 150 000° C./s.

The invention also relates to a plasma torch in order to manufacture, preferably with a process according to the invention, a feed powder according to the invention, said torch comprising a plasma gun configured in order to generate a plasma jet along an axis X and an injector for injecting a powder formed of granules into said plasma jet, said axis X forming an angle α of less than 30°, of less than 20°, of less than 10°, of less than 5°, preferably zero, with a vertical line.

A plasma torch according to the invention advantageously produces a feed powder which is very pure and dense, with few secondaries, the bulk density of the powder reaching 2.3 g/cm³ and more, to be compared with the preferred density of 1.8 g/cm³ and the value of 2.2 g/cm³ for an example disclosed in U.S. Pat. No. 7,931,836 and US 2011/0129399.

Figure 2:
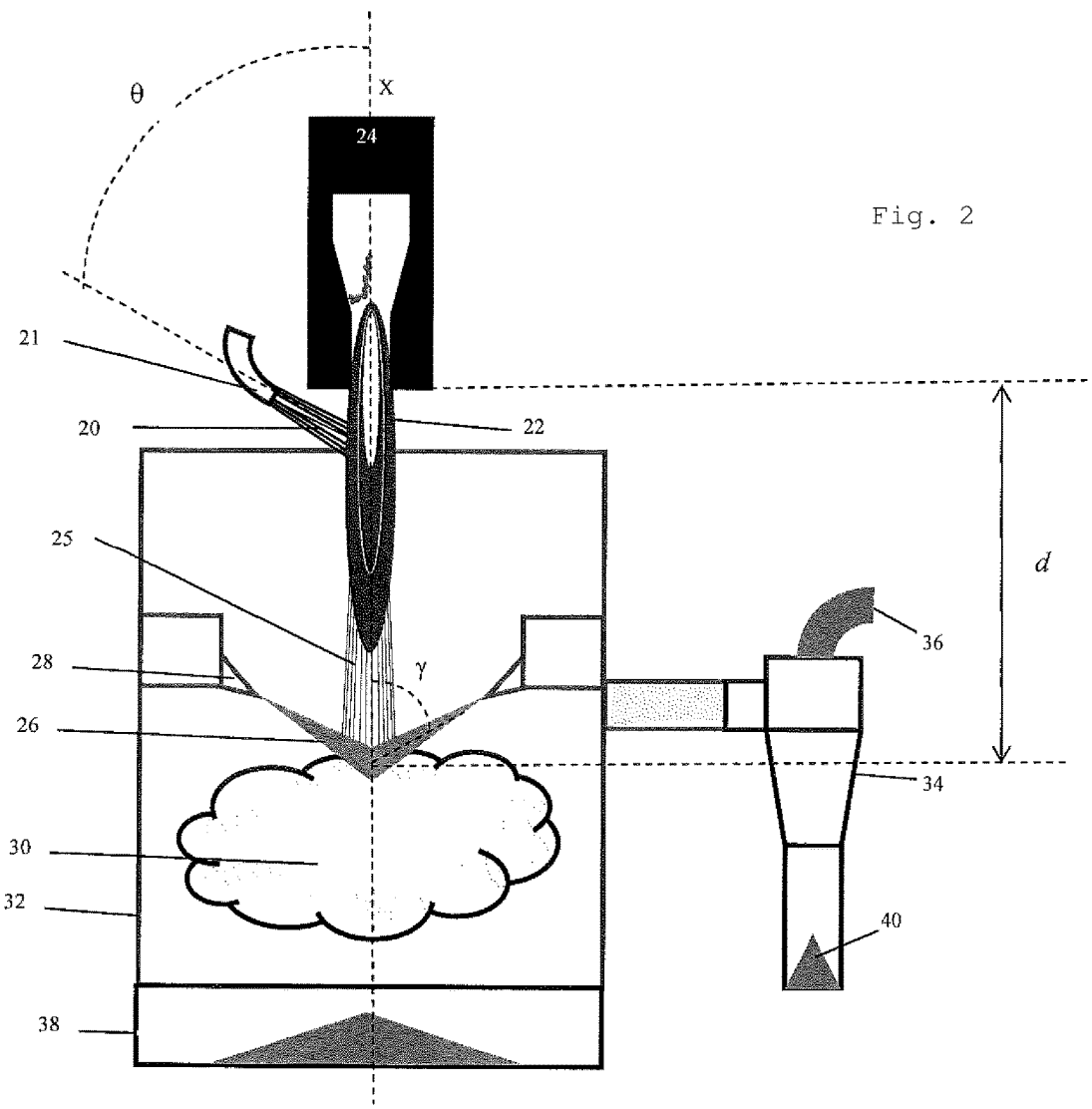

A plasma torch according to the invention can also comprise one or more of the following optional characteristics:

preferably, the plasma torch comprises at least one nozzle arranged so as to inject a cooling fluid, preferably air, so as to cool the droplets resulting from the heating of the powder formed of granules which is injected into the plasma jet. The cooling fluid is preferably injected toward the downstream direction of the plasma jet (as represented in FIG. 2) and the angle γ between the path of said droplets and the path for the cooling fluid is preferably less than or equal to 80°, preferably less than or equal to 60°, and/or greater than or equal to 10°, preferably greater than or equal to 20°, preferably greater than or equal to 30°. Preferably, the axis of injection Y of any nozzle and the axis X of the plasma jet are secant.

Preferably, the distance d between the external surface of an anode of the plasma gun and the region of cooling by the injected cooling fluid is between 50 mm and 400 mm, preferably between 100 mm and 300 mm.

Preferably, the torch comprises several said nozzles, preferably uniformly spaced around said axis X, preferably so as to generate a stream of cooling fluid which is substantially conical or annular around the axis X.

The invention also relates to a thermal spraying process comprising a stage of plasma spraying of a feed powder according to the invention over a substrate in order to obtain a liner.

The invention also relates to a body comprising a substrate and a liner covering, at least partially, said substrate, said liner comprising over 99.8% of a rare earth metal oxide and/or of hafnium oxide and/or of an yttrium-aluminum oxide, as percentage by weight on the basis of the oxides, and exhibiting a porosity of less than or equal to 1.5%, measured on a photograph of a polished section of said liner. Preferably, the porosity of the liner is less than 1%.

Preferably, the liner comprises more than 99.9%, more than 99.95%, more than 99.97%, more than 99.98%, more than 99.99%, preferably more than 99.999%, of a rare earth metal oxide and/or of hafnium oxide and/or of an yttrium-aluminum oxide, as percentage by weight on the basis of the oxides.

Such a liner may be manufactured with a thermal spraying process according to the invention.

The substrate may be a wall of an oven used in the treatment of semiconductors.

The oven may comprise semiconductors, in particular silicon wafers. The oven may be equipped with chemical vapor deposition (CVD) means or with physical vapor deposition (PVD) means.

Definition

The "impurities" are the unavoidable constituents, unintentionally and necessarily introduced with the starting materials or resulting from the reactions between the constituents. The impurities are not necessary constituents but only tolerated constituents. The level of purity is preferably measured by GDMS (Glow Discharge Mass Spectroscopy), which is more precise than ICP-AES (Inductively Coupled Plasma-Atomic Emission Spectrometry).

The "circularity" of the particles of the powder is conventionally determined in the following way: The powder is dispersed over a flat pane of glass. The images of the individual particles are obtained by scanning the dispersed powder under an optical microscope, while keeping the particles in focus, the powder being illuminated through the bottom of the pane of glass. These images may be analyzed using a device of the MORPHOLOGI® G3 type software sold by Malvern.

Figure 4:
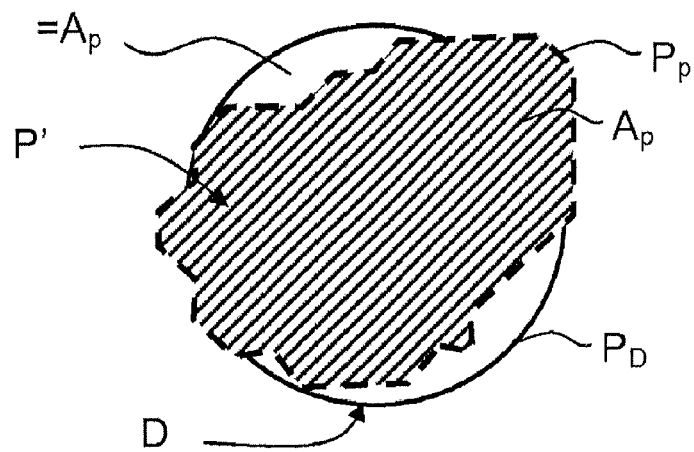

As represented in FIG. 4, in order to evaluate the "circularity" C of a particle P', the perimeter $P_D$ of the disk D exhibiting an area equal to the area $A_p$ of the particle P' is determined on an image of this particle. Furthermore, the perimeter $P_p$ of this particle is determined. The circularity is equal to the ratio $P_D/P_p$. Thus, $$C = \frac{2*\sqrt{\pi A_p}}{P_p}.$$

The more elongated the particle, the lower the circularity. The handbook for use of the Sysmex FPIA 3000 also describes this procedure (see "detailed specification sheets" on www.malvern.co.uk).

In order to determine a percentile of circularity (described hereinafter), the powder is poured over a flat pane of glass and observed as explained above. The number of particles counted should be greater than 250 in order for the percentile measured to be substantially identical, whatever the way in which the powder is poured over the pane of glass.

The aspect ratio A of a particle is defined as the ratio of the width of the particle (its greatest dimension perpendicular to the direction of its length) to its length (its greatest dimension).

In order to determine a percentile of aspect ratio, the powder is poured over a flat pane of glass and observed as explained above, in order to measure the lengths and the widths of the particles. The number of particles counted should be greater than 250 in order for the percentile measured to be substantially identical, whatever the way in which the powder is poured over the pane of glass.

The 10 percentile or "centile" ($P_{10}$), 50 percentile or "centile" ($P_{50}$), 90 percentile or "centile" ($P_{90}$) and 99.5 percentile or "centile" ($P_{99.5}$), and more generally the "n" percentile or "centile" $P_n$ of a property P of the particles of a powder formed of particles are the values of this property corresponding to the percentages by number of 10%, 50%, 90%, 99.5% and n %, respectively, on the cumulative distribution curve relating to this property of the particles of the powder, the values relating to this property being classified by increasing order. In particular, the $D_n$, $A_n$ and $C_n$ percentiles relate to the size, to the aspect ratio and to the circularity, respectively.

For example, 10% by number of the particles of the powder have a size of less than $D_{10}$ and 90% of the particles by number have a size of greater than or equal to $D_{10}$. The percentiles relating to the size can be determined using a particle size distribution produced using a laser particle sizer.

Likewise, 5% by number of particles of the powder have this circularity less than the $C_5$ percentile. In other words, 95% by number of the particles of this powder have a circularity of greater than or equal to $C_5$.

The 50 percentile is conventionally referred to as the "median" percentile. For example, $C_{50}$ is conventionally referred to as "median circularity". Likewise, the $D_{50}$ percentile is conventionally referred to as "median size". The $A_{50}$ percentile also conventionally refers to the "median aspect ratio".

The term "size of a particle" is understood to mean the size of a particle given conventionally by a particle size distribution characterization carried out with a laser particle sizer. The laser particle sizer used can be a Partica LA-950 from Horiba.

The percentage or the fraction by number of particles having a size of less than or equal to a predetermined maximum size can be produced using a laser particle sizer.

The cumulative specific volume of the pores of the radius of less than 1 vim, as percentage of the powder bulk volume, is conventionally measured by mercury porosimetry according to the standard ISO 15901-1. It may be measured with a Micromeritics porosimeter.

The "bulk density" P of a powder formed of particles is conventionally defined as the ratio of the weight of the powder divided by the sum of the bulk volumes of said particles. In practice, it may be measured with a Micromeritics porosimeter at a pressure of 3.5 kPa.

The bulk volume of a powder formed of particles is conventionally defined as the sum of the bulk volumes of said particles. In practice, the bulk volume of a powder formed of particles is calculated by the weight of the powder divided by its bulk density.

The "relative density" of a powder is equal to its bulk density divided by its real density. The real density may be measured by helium pycnometry.

The "porosity" of a liner may be evaluated by analysis of images of a polished cross section of the liner. The lined substrate is sectioned using a laboratory cutter, for example by using a Struers Discotom device with an alumina-based cutting disk. The sample of the liner is subsequently mounted in a resin, for example by using a cold mounting resin of the Struers Durocit type. The mounted sample is subsequently polished by using polishing media of increasing fineness. Use may be made of sandpaper or, preferably, polishing disks with an appropriate polishing suspension. A conventional polishing procedure begins with a dressing of the sample (for example with a Struers Piano 220 abrasive disk), followed by changing the polishing cloths associated with the abrasive suspensions. The size of abrasive grains is reduced at each fine polishing stage, the size of the diamond abrasives beginning, for example, at 9 microns, then at 3 microns, terminating at 1 micron (Struers DiaPro series). For each abrasive grain size, the polishing is halted as soon as the porosity observed under an optical microscope remains constant. The samples are carefully cleaned between the stages, for example with water. A final polishing stage, after the stage of polishing with the 1 μm diamond, is carried out using colloidal silica (OP-U Struers, 0.04 μm) in combination with a cloth of soft felt type. After the cleaning, the polished sample is ready for observation with an optical microscope or with an SEM (Scanning Electron Microscope). Due to its superior resolution and the noteworthy contrast, the SEM is preferred for the production of images intended to be analyzed. The porosity can be determined from the images by using image analysis software (for example ImageJ, NIH), the thresholding being adjusted. The porosity is given as percentage of the surface area of the cross section of the liner.

The "specific surface" is conventionally measured by the BET (Brunauer-Emmett-Teller) method, as described in the *Journal of the American Chemical Society* 60 (1938), pages 309 to 316.

The "granulation" operation is a process for the agglomeration of particles using a binder, for example a polymer binder, in order to form agglomerated particles, which may possibly be granules. The granulation comprises in particular the atomization or spray drying and/or the use of a granulator or of a pelletizing device, but is not limited to these processes.

A "granule" is an agglomerated particle having a circularity of 0.8 or more.

A consolidation stage (which is optional and is not preferred in the invention) is an operation targeted at replacing, in the granules, the bonds due to organic binders with diffusion bonds: it is generally carried out by a heat treatment but without complete melting of the granules.

The "deposition yield" of a plasma spraying process is defined as the ratio, in percentage by weight, of the amount of material deposited on the substrate divided by the amount of feed powder injected into the plasma jet.

The "spraying productivity" is defined as the amount of material deposited per unit of time.

The flow rates in l/min are "standard", that is to say measured at a temperature of 20° C. under a pressure of 1 atm.

"Comprising a" or "comprising an" should be understood as "comprising at least one", unless otherwise indicated.

Unless otherwise indicated, all the composition percentages are percentages by weight on the basis of the weight of the oxides.

The properties of the powder may be evaluated by the characterization methods used in the examples.

QUICK DESCRIPTION OF THE FIGURES

Figure 3:
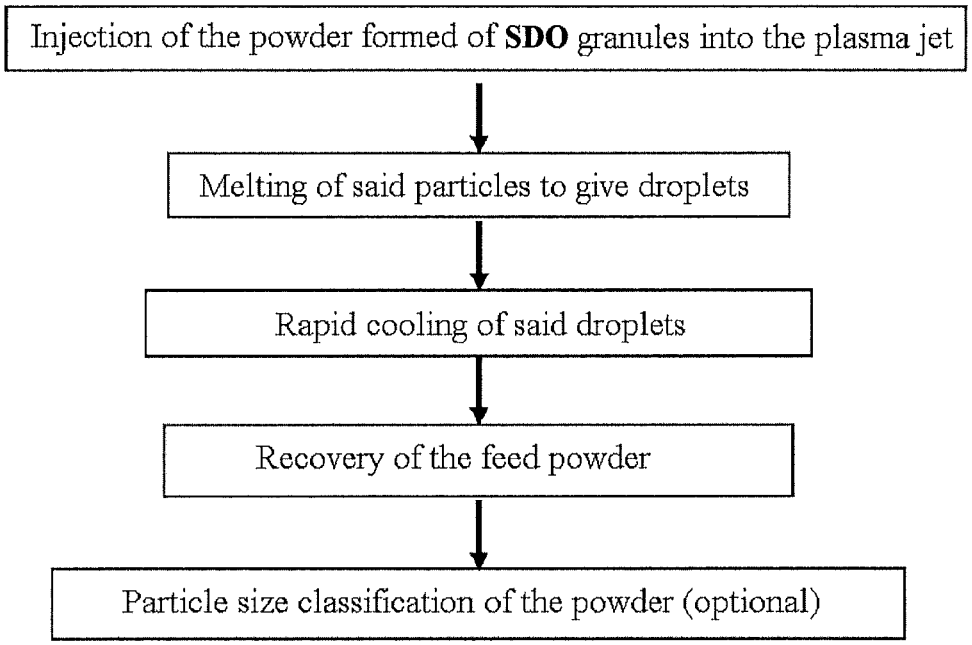
Figure 5:
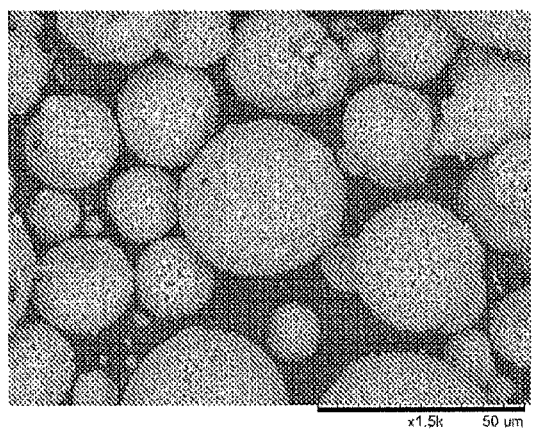
Figure 6:
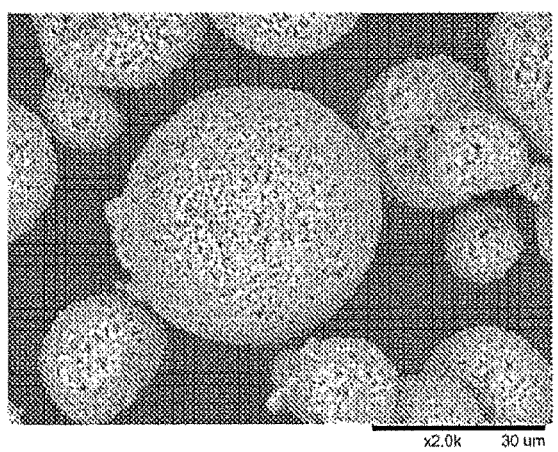
Figure 7:
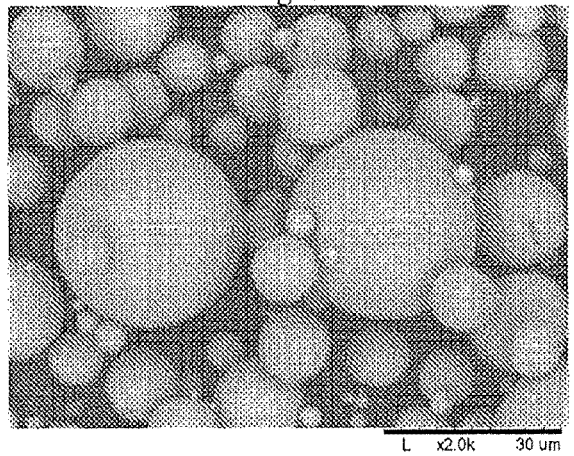

Other characteristics and advantages of the invention will become more clearly apparent on reading the description which will follow and on examining the appended drawings, in which:

FIG. 1 diagrammatically represents a process for the manufacture of a spray-dried only (SDO) powder;

FIG. 2 diagrammatically represents a plasma torch for the manufacture of a feed powder according to the invention;

FIG. 3 diagrammatically represents a process for manufacturing a feed powder according to the invention;

FIG. 4 illustrates the method which is used to evaluate the circularity of a particle, FIG. 5 is a photograph of the powder G3 formed of spray-dried only (SDO) particles according to the invention, FIG. 6 is a photograph of the powder formed of particles G4, FIG. 7 is a photograph of the powder obtained according to example I1 illustrating the invention.

DETAILED DESCRIPTION

Process for the Manufacture of a Feed Powder

FIG. 1 illustrates an embodiment of stage a) of a process for the manufacture of a feed powder according to the invention.

Any known granulation process can be used. In particular, a person skilled in the art knows how to prepare a slip suitable for a granulation.

In one embodiment, a binder mixture is prepared by addition of PVA (polyvinyl alcohol) 2 to deionized water 4. This binder mixture 6 is subsequently filtered through a 5 μm filter 8. Yttrium oxide powder 10 (for example with a purity of 99.99%), with a median size of 1 μm, is mixed into the filtered binder mixture to form a slip 12. The slip may comprise, by weight, for example, 55% of yttrium oxide and 0.55% of PVA, the remainder to 100% being composed of water. This slip is injected into an atomizer 14 in order to obtain a powder formed of granules 16 having a $D_{10}$ of 20 μm and a $D_{90}$ of 63 μm. A person skilled in the art knows how to adapt the atomizer in order to obtain the desired particle size distribution.

Preferably, the granules are agglomerates of particles of an oxide material exhibiting a median size of less than 3 μm, preferably of less than 2 μm, and preferably of less than 1.5 μm. The powder formed of granules can be sieved (5 mm sieve 18, for example) in order to eliminate the possible presence of residual materials fallen from the walls of the atomizer.

The resulting powder 20 is a "spray-dried only (SDO)" powder formed of granules.

FIGS. 2 and 3 illustrate an embodiment of the melting stage b) of a process for the manufacture of a feed powder according to the invention.

An SDO powder formed of granules 20, for example, as manufactured according to the process illustrated in FIG. 1, is injected by an injector 21 into a plasma jet 22 produced by a plasma gun 24, for example a ProPlasma HP. Conventional injection and plasma spraying techniques may be used, so as to mix the SDO powder formed of granules with a carrier gas and to inject the resulting mixture into the heart of the hot plasma.

However, the powder formed of granules which is injected does not have to be consolidated. In the absence of any intermediate consolidation stage, that is to say in the preferred embodiment, the injection has to be carried out gently in order to avoid any breaking of granules. A person skilled in the art knows how to adapt the injection parameters for a gentle injection of the granules and how to choose the granules so that the feed powder obtained on conclusion of stages c) or d) has a composition and a particle size distribution according to the invention.

Recourse to gentle injection is not conventional. This is because it is generally considered as preferable to inject the particles so as to disperse them in a very viscous plasma jet which flows at a very high speed. When the injected particles come into contact with such a plasma jet, they are subjected to valid impacts, which can break them in pieces. In order to penetrate the plasma jet, the particles to be dispersed are thus generally injected with a high speed, so as to benefit from a high kinetic energy. The particles to be injected must also exhibit a high mechanical strength in order to withstand these impacts.

Contrary to the conventional technique, in the preferred embodiment of the invention, nonconsolidated granules and in particular nonsintered granules are injected into a plasma torch, optionally a conventional torch, the parameters of which are adjusted so that the speed of the plasma jet and the speed of the injected granules are low, preferably as low as possible. A person skilled in the art knows that the speed of the plasma jet can be reduced by using an anode of large diameter and/or by reducing the flow rate of the primary gas. A person skilled in the art also knows that the speed of the granules is determined by the flow rate of the carrier gas.

Of course, the energy of the plasma jet, determined by the flow rate of the secondary gas, has to be sufficiently high to cause the granules to melt.

The powder formed of granules is injected with a carrier gas, preferably without any liquid. The ranges preferred for the parameters of the melting stage b) are presented in table 1.

In the plasma jet 22, the granules are melted to give droplets 25.

This melting advantageously makes it possible to reduce the content of impurities.

On the departure from the hot region of the plasma jet, the droplets are rapidly cooled by the surrounding cold air and also by forced circulation 26 of a cooling gas, preferably air. The air advantageously limits the reducing effect of the hydrogen.

Preferably, the forced cooling is generated by an assembly of nozzles 28 positioned around the axis X of the plasma jet 22, so as to create a substantially conical or annular flow of cooling gas.

The plasma gun 24 is oriented vertically toward the ground. Preferably, the angle between the vertical and the axis X of the plasma gun is less than 10°, preferably less than 5°. Advantageously, the cooling gas stream is thus perfectly centered with respect to the axis X of the plasma jet.

Preferably, the minimum distance d between the external surface of the anode and the region of cooling (where the droplets come into contact with the injected cooling fluid) is between 50 mm and 400 mm, preferably between 100 mm and 300 mm.

Advantageously, the forced cooling limits the generation of secondaries, resulting from the contact between very large hot particles and small particles in suspension in the densification chamber 32. Furthermore, such a cooling operation makes it possible to reduce the overall size of the treatment equipment, in particular the size of the collecting chamber.

The cooling of the droplets 25 makes it possible to obtain feed particles 30 which can be extracted in the lower part of the densification chamber 32.

The densification chamber may be connected to a cyclone 34, the exhaust gases of which are directed to a dust collector 36, so as to separate very fine particles 40. These very fine particles may result from the disintegration of the fragile granules in the plasma jet, although the preferred process of the invention makes it possible to limit these disintegrations. Depending on the configuration, some feed particles in accordance with the invention may also be collected in the cyclone. Preferably, these feed particles may be separated, in particular with an air separator.

Optionally, the collected feed particles 38 may be filtered, so that the median size $D_{50}$ is between 10 and 40 microns.

The preferred parameters for manufacturing a feed powder according to the invention are provided in the following table.

The characteristics of a column are preferably but not necessarily combined. The characteristics of the two columns may also be combined.

TABLE 1

| | Preferred characteristics | Even more preferred characteristics |
|---|---|---|
| Stage b) | | |
| Gun | High performance gun with a low wear (in order to treat the powder without contaminating it) | ProPlasma HP gun |
| Anode | Diameter >7 mm | HP8 anode (diameter of 8 mm) |
| Cathode | Doped tungsten cathode | ProPlasma cathode |
| Gas injector | Partially radial injection (swirling gas injection) | ProPlasma HP setup |
| Current | 500-700 A | 650 A |
| Power | >40 kW | Approximately 45 kW |
| Nature of the primary gas | Ar or $N_2$ | Ar |
| Flow rate of the primary gas | <50 l/min, preferably <40 l/min | 36 l/min |
| Nature of the secondary gas | $H_2$ | $H_2$ |
| Flow rate of the secondary gas | >20 vol % of the plasmagenic gas mixture | Approximately 25 vol % of the plasmagenic gas mixture |
| Injection of the powder formed of granules | | |
| Total flow rate of powder injected (g/min) | <180 g/min | ≤120 g/min |
| Diameter of the injection orifices (mm) | >1.85 mm | >2.0 mm |
| Nature of the carrier gas | Ar or $N_2$ | Ar |
| Flow rate of the carrier gas per injection orifice | <5.5 l/min | ≤3.5 l/min |
| Injection angle with respect to the axis X of the plasma jet (angle θ in FIG. 2) | 70°-85° | 75°-83° |
| Distance between an injection orifice and the axis X of the plasma jet | >10 mm | ≥12 mm |
| Cooling of the droplets | | |
| Cooling parameters | Conical or annular air curtain, oriented toward the downstream direction of the plasma jet | |
| Angle γ between the direction of injection of the cooling fluid, from a nozzle, and the axis X of the plasma jet | Toward the downstream direction of the plasma jet, ≥10° | Toward the downstream direction of the plasma jet, ≥30° and <60° |
| Total flow rate of the forced cooling fluid | 10-70 Sm$^3$/h | 35-50 Sm$^3$/h |
| Flow rate of the exhaust gas | 100-700 Sm$^3$/h | 250-500 Sm$^3$/h |
| Mean speed of the droplets | <200 m/s | 130-150 m/s |

TABLE 1-continued

| | Preferred characteristics | Even more preferred characteristics |
|---|---|---|
| Mean temperature of the droplets | >2000° C. | Approximately 2200° C. |
| Mean cooling rate | 50 000 to 200 000° C./s | |

The most preferred characteristics are in particular adapted for a powder injection flow rate of 120 g/min (powder formed of granules of yttrium oxide).

The speed and the temperature of the droplets are evaluated by a SprayWatch system, from Oseir, positioned 100 mm downstream of the injection of the powder, with an injection flow rate of 40 g/min.

The cooling rate is estimated for a powder having a median size $D_{50}$ between 10 and 40 microns, under an airstream.

The "ProPlasma HP" plasma torch is sold by Saint-Gobain Coating Solution. This torch corresponds to the T1 torch described in WO2010/103497, incorporated by reference.

Feed Powder

The inventors have discovered that, surprisingly, a feed powder according to the invention is very homogeneous from one feed particle to another.

A pure feed powder of yttrium oxide according to the invention may exhibit a bulk density of 2.30 g/cm$^3$ to 2.60 g/cm$^3$. The cumulative specific volume of the pores with a radius of less than 1 μm, measured according to the standard ISO 15901-1, may be less than $20 \times 10^{-3}$ cm$^3$/g.

Without being restricted by this theory, the inventors have observed that, surprisingly, the majority of the particles having a size of less than 20 microns are solid, that is to say without a central cavity, whereas the majority of the particles having a size of greater than 20 microns are hollow with a very dense wall. This observation may explain why, surprisingly, the bulk density dispersion index of a feed powder according to the invention is less than 0.2.

The hollow particles normally exhibit a shell which has a thickness of approximately 5 to 10 microns. As the median size of the particles $D_{50}$ is less than 40 microns and the size dispersion index $(D_{90}-D_{10})/D_{50}$ is less than 3, the hollow particles are thus efficiently melted in the plasma jet, in the same way as the finest solid particles. The percentage of particles injected into the plasma jet which are completely melted is thus very high, which may result, in particular for a $Y_2O_3$ liner, in a porosity less than or equal to 1%.

As the median size of the particles $D_{50}$ is greater than or equal to 10 microns and the size dispersion index $(D_{90}-D_{10})/D_{50}$ is less than 3, the feed powder comprises substantially no very fine particles. Advantageously, the kinetic energy of the particles is thus also adapted for good penetration into the plasma jet.

The size dispersion index is preferably greater than or equal to 0.4, in order to avoid excessive costs.

The low bulk density dispersion index and the specific size distribution of a feed powder according to the invention advantageously results in a very homogeneous and very dense liner when this feed powder is sprayed with a plasma torch.

Finally, the specific size distribution of a feed powder according to the invention advantageously confers on it a flowability entirely suited to plasma spraying.

Plasma Deposition

The deposition of particles in order to produce a liner using a plasma gun is a conventional technique. Any known technique may be used. The preferred parameters are provided in the following table.

TABLE 2

Deposition of the liner: preferred parameters

| | |
|---|---|
| Gun | ProPlasma HP gun |
| Anode | HP 6.5 anode (diameter: 6.5 mm) |
| Cathode | ProPlasma doped tungsten cathode |
| Current | >600 A, preferably approximately 650 A |
| Power | >40 kW, preferably approximately 49 kW |
| Nature of the primary gas | Argon |
| Flow rate of the primary gas | >35 l/min, preferably approximately 40 l/min |
| Nature of the secondary gas | Hydrogen |
| Flow rate of the secondary gas | >20% of the plasmagenic mixture, preferably approximately 25% |
| Nature of the carrier gas | Argon |
| Flow rate of the carrier gas | Approximately 5 l/min |
| Injection flow rate of the feed powder (g/min) | 30 to 90, preferably 50 to 70 |
| Spraying distance | >90 mm, preferably approximately 120 mm |
| Diameter of the injector orifice (mm) | 1.8 mm for 25 to 35 g/min per injector |
| Distance between the injector and the axis of the plasma jet | <10 mm, preferably approximately 6 mm |
| Injection angle with respect to the axis of the plasma jet | 90° (perpendicular to the axis) |
| Rate of displacement of the gun | >800 mm/s, preferably approximately 1000 mm/s |
| Pitch (mm) | 1-5 mm, preferably approximately 2 mm |
| Nature of the substrate | Metal (steel, aluminum, anodized aluminum and the like) or ceramic (aluminum, and the like) |

The metal substrates may be cooled, for example with air, for example by cooling nozzles mounted on the plasma torch in order to keep the temperature of the substrate below 300° C., preferably below 150° C. In the case of substrates made of ceramic, a preheating may be carried out in order to improve the adhesion (as described, for example, in the U.S. Pat. No. 7,329,467).

EXAMPLES

The following examples are provided for the purposes of illustration and do not limit the scope of the invention.

The feed powders I1 to I5, C1 and C2 were manufactured according to the invention with a plasma torch similar to the plasma torch represented in FIG. 2, starting from a source of pure $Y_2O_3$ powder having a median diameter $D_{50}$ of 1.2 microns, measured with a Horiba laser particle analyzer, and a chemical purity of 99.999% of $Y_2O_3$.

In stage a), a binder mixture is prepared by addition of PVA (polyvinyl alcohol) binder 2 to deionized water 4. This binder mixture is subsequently filtered through a 5 μm filter 8. Yttrium oxide powder 10 is mixed into the filtered binder mixture in order to form a slip 12. The slip is prepared so as to comprise a percentage by weight, 55% of yttrium oxide and 0.55% of PVA, the remainder to 100% being deionized water. The slip is intensively mixed using a high shear speed mixer.

The granules G3 and G6 were subsequently obtained by atomization of the slip, using an atomizer. In particular, the slip is atomized in the chamber of a GEA Niro SD 6.3 R atomizer, the slip being introduced at a flow rate of approximately 0.38 l/min.

The speed of the rotating atomization wheel, driven by a Niro FS1 motor, is regulated in order to obtain the targeted sizes of the granules. The speed of this wheel is higher for the manufacture of the G3 granules than for the manufacture of the G6 granules.

The air flow rate is adjusted in order to maintain the inlet temperature 295° C. and the outlet temperature at approximately 125° C., so that the residual moisture content of the granules is between 0.5% and 1%.

In stage b), the granules of stage a) are injected into a plasma produced with a plasma gun.

In order to cool the droplets, 7 Silvent 2021L nozzles, sold by Silvent, were attached to a Silvent 463 annular nozzle holder, sold by Silvent. The nozzles are uniformly spaced along the annular nozzle holder, so as to generate a substantially conical airstream.

The powder collecting yield in the chamber 38 is the ratio of the amount of feed particles collected in the chamber 38 to the total amount of granules injected into the plasma.

The powder I1 exhibits the best compromise between the yield, which has to be as high as possible, and the percentages of very fine particles (<10 μm and <5 μm), which have to be as low as possible, with an acceptable bulk density.

The powder I5 is used to illustrate the effect of the size dispersion index. This powder was obtained from granules G6 by plasma treatment.

The comparative feed powder G3 was manufactured according to the same stage a) as I1 and I5, but it was not subjected to stages b) and c) before being sprayed in order to form a liner.

The comparative feed powder G4 was manufactured like G3 but, after the spray drying stage, the powder was sintered under air at 1600° C. for a period of time of two hours.

TABLE 3

| Treatment of the powder | Spray dried + plasma spraying | | Spray dried only | Spray dried and sintered |
|---|---|---|---|---|
| Granules (particles obtained after spray drying) | | | | |
| Reference of the granules | G3 | G6 | G3 | G4 |
| Type of granules | Spray dried yttrium oxide powder | | | |
| Granules $D_{10}$ (μm) | 23.4 | 23 | | |
| Granules $D_{50}$ (μm) | 39.0 | 47 | | |
| Granules $D_{90}$ (μm) | 63.0 | 102 | | |
| Mean bulk density | 1.05 | 0.95 | 1.05 | 1.45 |
| Cumulative specific volume of the pores having a radius of less than 1 micron ($10^{-3}$ cm$^3$/g of the powder sample) | 260 | 430 | 260 | 140 |

TABLE 3-continued

| Treatment of the powder | Spray dried + plasma spraying | | | | | | | Spray dried only | Spray dried and sintered |
|---|---|---|---|---|---|---|---|---|---|
| *Single consolidation stage b): injection* | | | | | | | | | |
| Feed rate for granules | 120 g/min | | | | | | | 150 g/min | |
| Number of injection orifices (powder lines) | 3 | | | | | | | 4 | |
| Angle of injection with respect to the axis X of the plasma jet (angle θ in FIG. 2) | 80° toward the downstream direction | | | | | | | | |
| Distance of the injector (radially from the axis of the gun) | 12 mm | | | | 14 mm | 12 mm | 12 mm | | |
| Diameter of the injector | 2.0 mm | | | | 1.8 mm | 2.0 mm | 1.8 mm | | |
| Flow rate of the argon carrier gas (per powder line) | 3.5 l/min | | | | 6.0 l/min | 3.5 l/min | 6.0 l/min | | |
| *Single consolidation stage b): melting* | | | | | | | | | |
| Plasma gun used | ProPlasma HP | | | | | | | | |
| Diameter of the anode of the plasma gun | 8 mm | | | | | | | | |
| Voltage (V) | 74 | | | | | | | | |
| Power (kW) | 48 | | | | | | | | |
| Plasmagenic gas mixture | Ar + $H_2$ | | | | | | | | |
| Flow rate of the plasmagenic gas | 48 l/min | | | | | | 48 l/min | | |
| $H_2$ ratio in the plasmagenic gas | 25% | | | | | | | | |
| Intensity of the plasma arc | 650A | | | | | | 650A | | |
| *Single consolidation stage b): cooling* | | | | | | | | | |
| Annular cooling nozzles | 7 Silvent 2021L nozzles attached to a Silvent 463 annular nozzle holder | | | | | | | | |
| Total flow rate of cooling air (Sm³/h) | 0 | 60 | 42 | 35 | 42 | | 42 | | |
| Flow rate of the air in the cyclone (Sm³/h) | 650 | 650 | 650 | 350 | 350 | | 350 | | |
| Powder collecting yield in the chamber (28) | 54% | 13% | 30% | 77% | 20% | | 59% | 57% | |
| *Feed particles collected (feed powder)* | | | | | | | | | |
| Reference | I1 | I2 | I3 | I4 | C1 | I5 | C2 | G3 | G4 |
| $D_{10}$ (μm) | 153 | 15.7 | 15.8 | 14.9 | 10 | 13.1 | 7 | 23.4 | 15.5 |
| $D_{50}$ (μm) | 24.9 | 25.0 | 25.0 | 24.1 | 22 | 31.8 | 22 | 39.0 | 27.3 |
| $D_{90}$ (μm) | 37.2 | 37.4 | 37.0 | 36.8 | 35 | 79.1 | 85 | 63.0 | 43.2 |
| $(D_{90} - D_{10})/D_{50}$ | 0.86 | 0.87 | 0.85 | 0.91 | 1.1 | 2.1 | 3.5 | 1.0 | 1.0 |
| Fraction by number < or equal to 10 μm | 1.8% | 2.4% | 2.4% | 2.6% | 10.3% | 4.5% | 13.8% | 1.1% | 2.6% |
| Fraction by number < or equal to 5 μm | 0.9% | 1.5 | 1.5 | 1.2 | 5.1% | 0.2% | 8.7% | 1.0% | 0.6% |
| Median circularity $C_{50}$ | 0.993 | 0.996 | 0.994 | 0.990 | 0.982 | 0.967 | 0.942 | 0.985 | 0.956 |
| Circularity $C_5$ | 0.902 | 0.909 | 0.905 | 0.888 | 0.895 | 0.862 | 0.839 | 0.843 | 0.854 |
| Median aspect ratio $A_{50}$ | 0.98 | 0.98 | 0.98 | 0.98 | 0.98 | 0.94 | 0.90 | 0.91 | 0.80 |
| Specific surface (m²/g) | 0.44 | 0.27 | 0.41 | 0.35 | 0.57 | 0.52 | 0.80 | 6.2 | 0.88 |
| Level of impurities measured by GDMS | <150 ppm | <150 ppm | <150 ppm | <150 ppm | <150 ppm | <150 ppm | <150 ppm | <300 ppm | <300 ppm |
| Bulk density measured by mercury porosimetry | 2.37 | 2.50 | 2.49 | 2.31 | 2.53 | 2.25 | 2.1 | 1.05 | 1.45 |
| Calculated relative density | 0.47 | 0.50 | 0.50 | 0.46 | 0.50 | 0.45 | 0.42 | 0.21 | 0.29 |
| Cumulative specific volume of the pores having a radius of less than 1 micron ($10^{-3}$ cm³/g of the powder sample) | 13 | 8 | 9 | 13 | 7 | 30 | 80 | 260 | 140 |
| Cumulative specific volume of the pores having a radius of less than 1 micron (% of the powder bulk volume) | 3.1 | 2.0 | 2.2 | 3.0 | 1.8 | 7 | 17 | 27 | 20 |
| $(P_{<50} - P)/P$ or bulk density dispersion index | 0.08 | 0.04 | 0.03 | 0.10 | 0.02 | 0.07 | 0.17 | | |

Table 3 shows that gentle injection parameters, with a large injector diameter and a low flow rate of the argon carrier gas, help in reducing the amount of very fine particles in the pure yttrium oxide feed powder, which are harmful to the final liner. A low amount of very fine particles also facilitates the application of the liner by thermal spraying. It improves the flowability and the deposition yield.

The liners on an aluminum substrate were obtained using feed powders I1, I5, C1, C2, G3 and G4. The plasma spraying parameters are summarized in table 4.

The porosity of the liners was measured by analysis of images obtained by scanning electron microscopy (SEM) on polished sections of samples having a mean thickness of 0.4 mm.

TABLE 4

|  |  | Example | | | | | | |
| --- | --- | --- | --- | --- | --- | --- | --- | --- |
|  |  | 1 | 2 | 3* | 4* | 5 | 6* | 7* |
|  | Feed powder | I1 | I1 | G3 | G4 | I5 | C2 | C1 |
|  | Plasma torch | | | ProPlasma HP | | | | |
|  | Diameter of the anode | | | 6.5 mm | | | | |
| Power generator | Current (A) | | | 650 | | | | |
|  | Voltage (V) | | | 74 | | | | |
|  | Power (kW) | | | 48 | | | | |
| Plasmagenic gas | Argon (l/min) | | | 40 | | | | |
|  | Hydrogen (l/min) | | | 13 | | | | |
|  | Helium (l/min) | | | 0 | | | | |
| Spraying of the powder | Carrier gas | | | Ar | | | | |
|  | Flow rate of the carrier gas (l/min) | | | 5.0 | | | | |
|  | Injection flow rate of the powder (g/min) | 50 | 70 | 70 | 70 | 50 |  | 50 |
|  | Spraying distance (distance between the outlet of the torch and the substrate) (mm) | 100 | 120 | 120 | 120 | 100 | 100 |  |
|  | Diameter of the orifice for the injection of the powder to be sprayed | | | 1.8 mm | | | | |
|  | Distance between the injector and the axis X of the plasma jet | | | 6.0 mm | | | | |
|  | Angle of injection with respect to the axis X of the plasma jet | | | 90° | | | | |
| Liner | Porosity (%) | 0.7 | 1.0 | 1.9 | 1.9 | 1.4 | 3.0 | 1.8 |
|  | Deposition yield (%) | 60.5 | 57.2 | 21.9 | 30.6 | 45 | 40 | 49 |
|  | Spraying productivity (g/min) | 30 | 40 | 15 | 21 | 32 | 20 | 25 |

*outside the invention

The liners of the examples of the invention are very dense and are manufactured with a good deposition yield and a good spraying productivity.

Comparative examples 3* and 4* respectively show that the use of a nonconsolidated feed powder or of a sintered feed powder instead of feed powder according to the invention (feed powder resulting from plasma melting of nonconsolidated granules: I1 and I5) considerably increases the porosity of the liner.

Examples 5 and 6* show that an increase in the size dispersion index increases the porosity of the liner.

Comparative example 7* shows that the use of a powder having a high fraction of particles having a size of less than or equal to 5 microns increases the porosity of the liner.

It is now clear that the invention provides a feed powder exhibiting size and bulk density distributions which confer a very high density on the liner. In addition, this feed powder can be efficiently plasma sprayed with a good productivity.

Of course, the invention is not limited to the embodiments described and represented.

The invention claimed is:

1. A powder formed of particles, more than 95% by number of said particles exhibiting a circularity of greater than or equal to 0.85, said powder comprising more than 99.8% of a rare earth metal oxide and/or of hafnium oxide and/or of an yttrium-aluminum oxide, as percentage by weight on the basis of the oxides, and having:
   a median particle size $D_{50}$ of between 10 and 40 microns and a size dispersion index $(D_{90}-D_{10})/D_{50}$ of less than 3;
   a percentage by number of particles having a size of less than or equal to 5 μm which is less than 5%;
   a bulk density dispersion index $(P_{<50}-P)/P$ of less than 0.2,
   a cumulative specific volume of the pores having a radius of less than 1 μm being less than 10% of the bulk volume of the powder,
   in which the $D_n$ percentiles of the powder are the particle sizes corresponding to the percentages, by number, of n %, on a cumulative distribution curve of the size of the particles of the powder, the particle sizes being classified by increasing order, the density $P_{<50}$ being the bulk density of the fraction of the particles having a size of less than or equal to $D_{50}$, and the density P being the bulk density of the powder,
   the powder being manufactured according to a process comprising:
   a) granulation using a binder so as to obtain a set formed of granules having a median size $D_{50}$ of between 20 and 60 microns and a circularity of 0.8 or more and comprising more than 99.8% of a rare earth metal oxide and/or of hafnium oxide and/or of an yttrium-aluminum oxide, as percentage by weight on the basis of the oxides;

b) injecting said set formed of granules, via a carrier gas, through an injector as far as a plasma jet generated by a plasma gun, so as to obtain molten droplets;
c) cooling said molten droplets so as to obtain the powder formed of the particles; and
d) optionally, performing particle size selection of the powder.

2. The powder as claimed in claim 1, in which:
the median size of the particles $D_{50}$ is greater than 15 μm, and/or
the size dispersion index $(D_{90}-D_{10})/D_{50}$ is less than 2.2 and/or greater than 0.4, and/or
the percentage by number of particles having a size of less than 10 micrometers is less than 3%, and/or
the specific surface of the particles of the powder is less than 3 m$^2$/g, and/or
the bulk density dispersion index $(P_{<50}-P)/P$ is less than 0.15.

3. The powder as claimed in claim 1, in which:
the median size of the particles $D_{50}$ is less than 30 μm, and/or
the size dispersion index $(D_{90}-D_{10})/D_{50}$ is less than 1.3, and/or
the percentage by number of the particles having a size of less than 10 micrometers is less than 2%, and/or
the specific surface of the particles of the powder is less than 1 m$^2$/g, and/or
the bulk density dispersion index $(P_{<50}-P)/P$ is less than 0.1.

4. The powder as claimed in claim 1, in which:
the size dispersion index $(D_{90}-D_{10})/D_{50}$ is greater than 0.7, and/or
the specific surface of the particles of the powder is less than 0.5 m$^2$/g.

5. The powder as claimed in claim 1, having a relative density greater than 0.4, where the relative density is equal to a bulk density of said powder divided by a real density of said powder.

6. The powder as claimed in claim 1, in which the bulk density of the particles is greater than 2.25.

7. A process for the manufacture of a powder as claimed in claim 1, said process comprising the following stages:
a) granulation using a binder so as to obtain a set formed of granules having a median size D50 of between 20 and 60 microns and having a circularity of 0.8 or more and comprising more than 99.8% of a rare earth metal oxide and/or of hafnium oxide and/or of an yttrium-aluminum oxide, as percentage by weight on the basis of the oxides;
b) injection of said set formed of granules, via a carrier gas, through an injector as far as a plasma jet generated by a plasma gun, so as to obtain molten droplets;
c) cooling said molten droplets, so as to obtain the powder;
d) optionally, particle size selection of said powder.

8. The process as claimed in claim 7, in which said plasma gun is configured in order to generate said plasma jet around an axis X forming an angle α of less than 30° with a vertical line.

9. The process as claimed in claim 7, in which a cooling fluid is injected into said plasma jet so as to cool said droplets, the cooling fluid being injected toward the downstream direction of the plasma jet and the angle γ between the path of the droplets and the path for the cooling fluid being less than or equal to 80°.

10. The process as claimed in claim 9, in which an annular stream of cooling fluid is generated around an axis X forming an angle α of less than 30° with a vertical line.

11. The process as claimed in claim 9, in which a minimum distance between an external surface of an anode of said plasma gun and a region where the droplets come into contact with said cooling fluid is between 50 mm and 400 mm.

12. The process as claimed in claim 7, in which the granulation comprises an atomization.

13. A thermal spraying process comprising a stage of thermal spraying of a powder as claimed in claim 1 or manufactured as claimed in claim 7.

14. A treatment chamber for semiconductors, said chamber comprising a wall protected by a liner, said liner comprising more than 99.95% of a rare earth metal oxide and/or of a hafnium oxide and/or of an yttrium-aluminum oxide, as percentage by weight on the basis of the of oxides, and exhibiting a porosity of less than or equal to 1.5%, said liner being a thermally sprayed powder, the powder being as claimed in claim 1.

* * * * *